US007931530B2

(12) United States Patent
Anderson et al.

(10) Patent No.: US 7,931,530 B2
(45) Date of Patent: Apr. 26, 2011

(54) WAGERING GAME WITH TIME-BASED BONUS

(75) Inventors: Peter R. Anderson, Chicago, IL (US); Allon G Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 394 days.

(21) Appl. No.: 11/919,889

(22) PCT Filed: May 1, 2006

(86) PCT No.: PCT/US2006/016536
§ 371 (c)(1),
(2), (4) Date: Nov. 5, 2007

(87) PCT Pub. No.: WO2006/121663
PCT Pub. Date: Nov. 16, 2006

(65) Prior Publication Data

US 2009/0042641 A1 Feb. 12, 2009

Related U.S. Application Data

(60) Provisional application No. 60/678,598, filed on May 6, 2005.

(51) Int. Cl.
*A63F 13/00* (2006.01)

(52) U.S. Cl. ................ 463/20; 463/30; 463/40; 463/41; 463/42

(58) Field of Classification Search .......... 463/1, 16–18, 463/20, 6, 40–42
See application file for complete search history.

(56) References Cited

U.S. PATENT DOCUMENTS

| | | | | |
|---|---|---|---|---|
| 4,861,041 | A | 8/1989 | Jones et al. | 273/292 |
| 5,275,400 | A | 1/1994 | Weingardt et al. | 273/85 |
| 5,417,430 | A | 5/1995 | Breeding | 273/292 |
| 5,482,289 | A | 1/1996 | Weingardt | 273/269 |
| 5,564,700 | A | 10/1996 | Celona | 463/27 |
| 5,577,731 | A | 11/1996 | Jones | 273/292 |
| 5,655,961 | A | 8/1997 | Acres et al. | 463/27 |
| 5,722,890 | A | 3/1998 | Libby et al. | 463/17 |
| 5,743,800 | A | 4/1998 | Huard et al. | 463/26 |

(Continued)

FOREIGN PATENT DOCUMENTS

WO WO 99/15246 4/1999

(Continued)

OTHER PUBLICATIONS

PCT International Search Report for International Application No. PCT/US2005/015687 dated Oct. 28, 2005 (2 pages).

(Continued)

*Primary Examiner* — Ronald Laneau
*Assistant Examiner* — Ross A. Williams
(74) *Attorney, Agent, or Firm* — Nixon Peabody LLP

(57) ABSTRACT

A gaming system for playing a wagering game includes a display and a controller. The display displays a base game of the wagering game in response to receiving a wager input from a player. The controller is coupled to the display and, in response to receiving the wager input, is programmed to increment eligibility time to a counter of bonus-time eligibility. The counter is decremented as real time progresses. If the counter is greater than zero when a bonus game of the wagering game is triggered, the player is allowed to play the bonus game.

24 Claims, 11 Drawing Sheets

U.S. PATENT DOCUMENTS

| | | | | |
|---|---|---|---|---|
| 5,766,076 | A | 6/1998 | Pease et al. | 463/27 |
| 5,851,011 | A | 12/1998 | Lott | 273/292 |
| 6,000,699 | A | 12/1999 | Long | 273/292 |
| 6,105,964 | A | 8/2000 | Maahs | 273/292 |
| 6,110,043 | A | 8/2000 | Olsen | 463/27 |
| 6,146,273 | A * | 11/2000 | Olsen | 463/27 |
| 6,217,448 | B1 | 4/2001 | Olsen | 463/25 |
| 6,254,483 | B1 | 7/2001 | Acres | 463/26 |
| 6,331,148 | B1 | 12/2001 | Krause et al. | 473/274 |
| 6,358,149 | B1 | 3/2002 | Schneider et al. | 463/27 |
| 6,375,567 | B1 | 4/2002 | Acres | 463/25 |
| 6,409,602 | B1 | 6/2002 | Wiltshire et al. | 463/42 |
| 6,416,408 | B2 | 7/2002 | Tracy et al. | 463/16 |
| 6,416,409 | B1 | 7/2002 | Jordan | 463/27 |
| 6,435,510 | B2 | 8/2002 | Moore | 273/292 |
| 6,626,758 | B1 | 9/2003 | Parham et al. | 463/25 |
| 6,880,824 | B2 | 4/2005 | Thinnes | 273/139 |
| 7,255,645 | B2 | 8/2007 | Steil et al. | 463/27 |
| 2002/0006822 | A1 * | 1/2002 | Krintzman | 463/27 |
| 2002/0132660 | A1 | 9/2002 | Taylor | 463/16 |
| 2002/0187823 | A1 | 12/2002 | Khal | 463/13 |
| 2003/0030211 | A1 | 2/2003 | Brown | 273/139 |
| 2004/0063484 | A1 | 4/2004 | Dreaper et al. | 463/16 |
| 2004/0102238 | A1 * | 5/2004 | Taylor | 463/16 |
| 2004/0102243 | A1 * | 5/2004 | Olsen | 463/25 |
| 2004/0152511 | A1 | 8/2004 | Nicely et al. | 463/27 |
| 2005/0017451 | A1 | 1/2005 | Ollington | 273/292 |
| 2005/0037837 | A1 | 2/2005 | Rowe | 463/25 |
| 2005/0059472 | A1 | 3/2005 | Joshi et al. | 463/20 |
| 2005/0075889 | A1 | 4/2005 | Gomes et al. | 705/1 |
| 2005/0159207 | A1 | 7/2005 | Thomas | 463/20 |
| 2005/0187014 | A1 | 8/2005 | Saffari et al. | 463/27 |
| 2006/0009280 | A1 | 1/2006 | Joshi et al. | 463/25 |
| 2006/0019744 | A1 * | 1/2006 | Roemer | 463/26 |
| 2006/0035706 | A1 | 2/2006 | Thomas et al. | 463/27 |
| 2007/0026941 | A1 | 2/2007 | Block et al. | 463/29 |
| 2007/0259711 | A1 | 11/2007 | Thomas | 463/22 |

FOREIGN PATENT DOCUMENTS

| | | | |
|---|---|---|---|
| WO | WO 2005/113088 | A1 | 12/2005 |
| WO | WO 2006/014770 | A2 | 2/2006 |
| WO | WO 2006/014990 | A2 | 2/2006 |
| WO | WO 2006/039349 | A2 | 4/2006 |
| WO | WO 2007/117502 | A2 | 10/2007 |

OTHER PUBLICATIONS

PCT International Search Report for International Application No. PCT/US2006/016536 dated Oct. 5, 2006 (3 pages).

* cited by examiner

WAGERING GAME WITH TIME-BASED BONUS

CROSS REFERENCE TO RELATED APPLICATIONS

This application is a U.S. national phase of International Application No. PCT/US2006/016536, filed May 1, 2006, which claims the benefit of priority of U.S. Provisional Patent Application No. 60/678,598, filed May 6, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a time-based eligibility for a bonus game when the bonus game is triggered.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Some players play at a faster and/or higher rate than other players. For example, a first player may wager twice as fast and/or twice as much than a second player within a specific time period. One problem associated with some bonus games is that the first player, i.e., the fast-play and/or high-pay player, is not rewarded for his/her gaming experience. Because traditional gaming machines fail to reward a player that inputs more time and/or money into a specific gaming machine, the fast-play and/or high-play player may receive the same bonus opportunities as a slow-play and/or low-play player. Thus, a need exists for a gaming machine that rewards a fast-play and/or high-pay player. The present invention is directed to satisfying one ore more of these needs and solving other problems.

SUMMARY OF THE INVENTION

According to one aspect of the present invention, a gaming system for playing a wagering game includes a display and a controller. The display displays a base game of the wagering game in response to receiving a wager input from a player. The controller is coupled to the display and, in response to receiving the wager input, is programmed to increment eligibility time to a counter of bonus-time eligibility. The counter is decremented as real time progresses. If the counter is greater than zero when a bonus game of the wagering game is triggered, the player is allowed to play the bonus game.

According to another aspect of the invention, a method of conducting a wagering game on a gaming machine includes receiving at least one wager input from a player for playing a base game of the wagering game. In response to receiving the wager input, eligibility time is incremented to a counter of bonus-time eligibility. On a periodic basis, a determination is made whether a bonus game of the wagering game has been randomly triggered. In response to the counter being greater than zero when the bonus game is triggered, the player is allowed to play the bonus game.

According to yet another aspect of the invention, a method of conducting a wagering game on a gaming system having a plurality of gaming terminals for playing a common special event associated with the wagering game. The method includes receiving at least one first wager input on a first one of the plurality of gaming terminals for playing a base game of the wagering game. In response to receiving the first wager input, eligibility time is incremented to a first counter of bonus-time eligibility, which is associated with the first one of the plurality of gaming terminals. At least one second wager input is received on a second one of the plurality of gaming terminals for playing another base game of the wagering game. In response to receiving the second wager input, eligibility time is incremented to a second counter of bonus-time eligibility, which is associated with the second one of the plurality of gaming terminals. If any of the first counter and the second counter is greater than zero when the common bonus game is triggered, the player of a corresponding one of the plurality of gaming terminals is allowed to play the common bonus game.

According to yet another aspect of the invention, a method of initiating a special event for a wagering game includes receiving a wager input from a player for playing the wagering game. In response to receiving the wager input, the player is provided with one or more eligibility-time increments from a plurality of time increments during which the player is eligible to participate in the special event. The special event is triggered for at least one of the plurality of time increments. If the at least one of the plurality of time increments is a time increment for which the player has been provided an eligibility-time increment, the player is allowed to play the special event.

According to yet another aspect of the invention, a computer readable storage medium is encoded with instructions for directing a gaming device to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
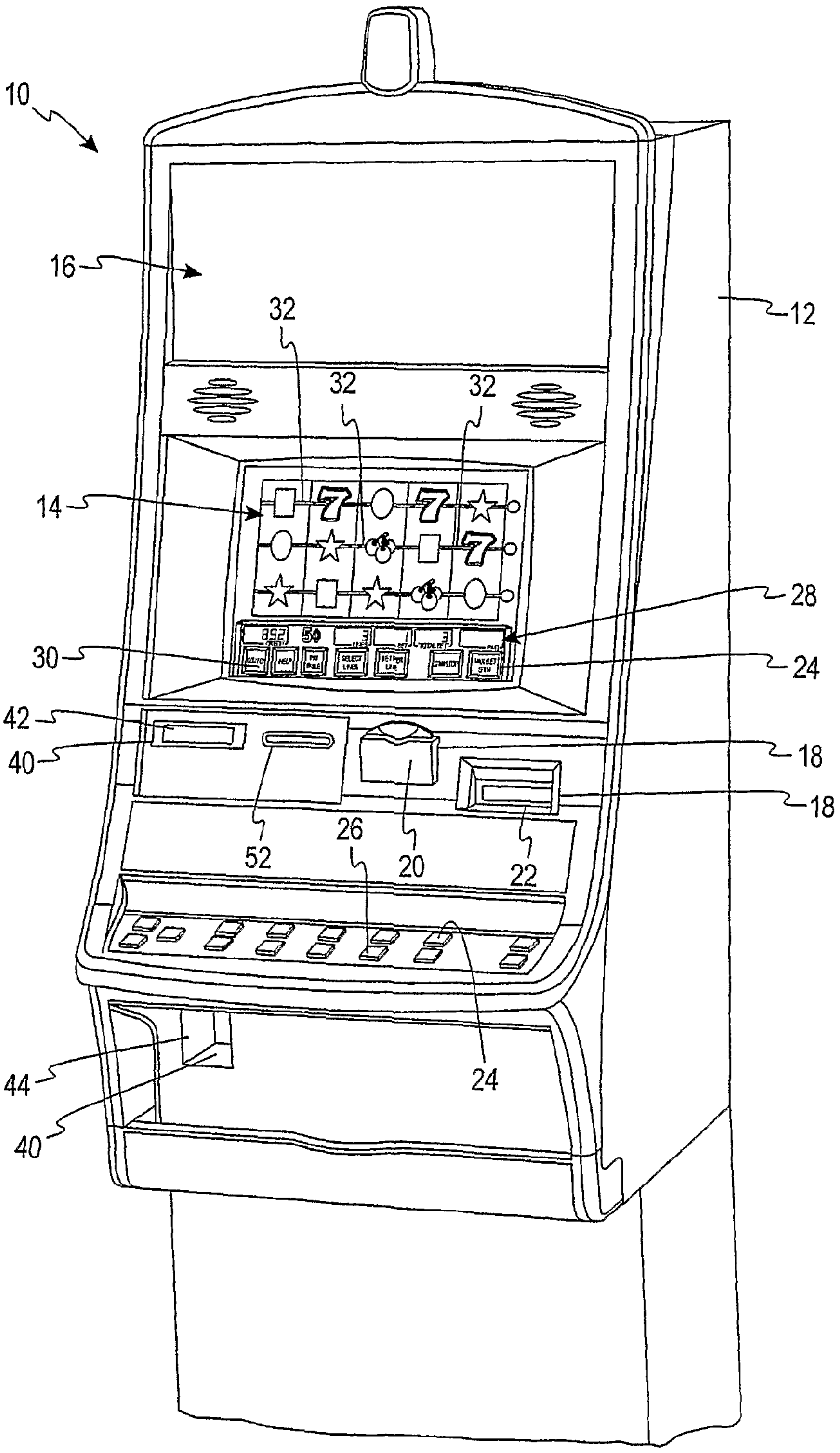
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
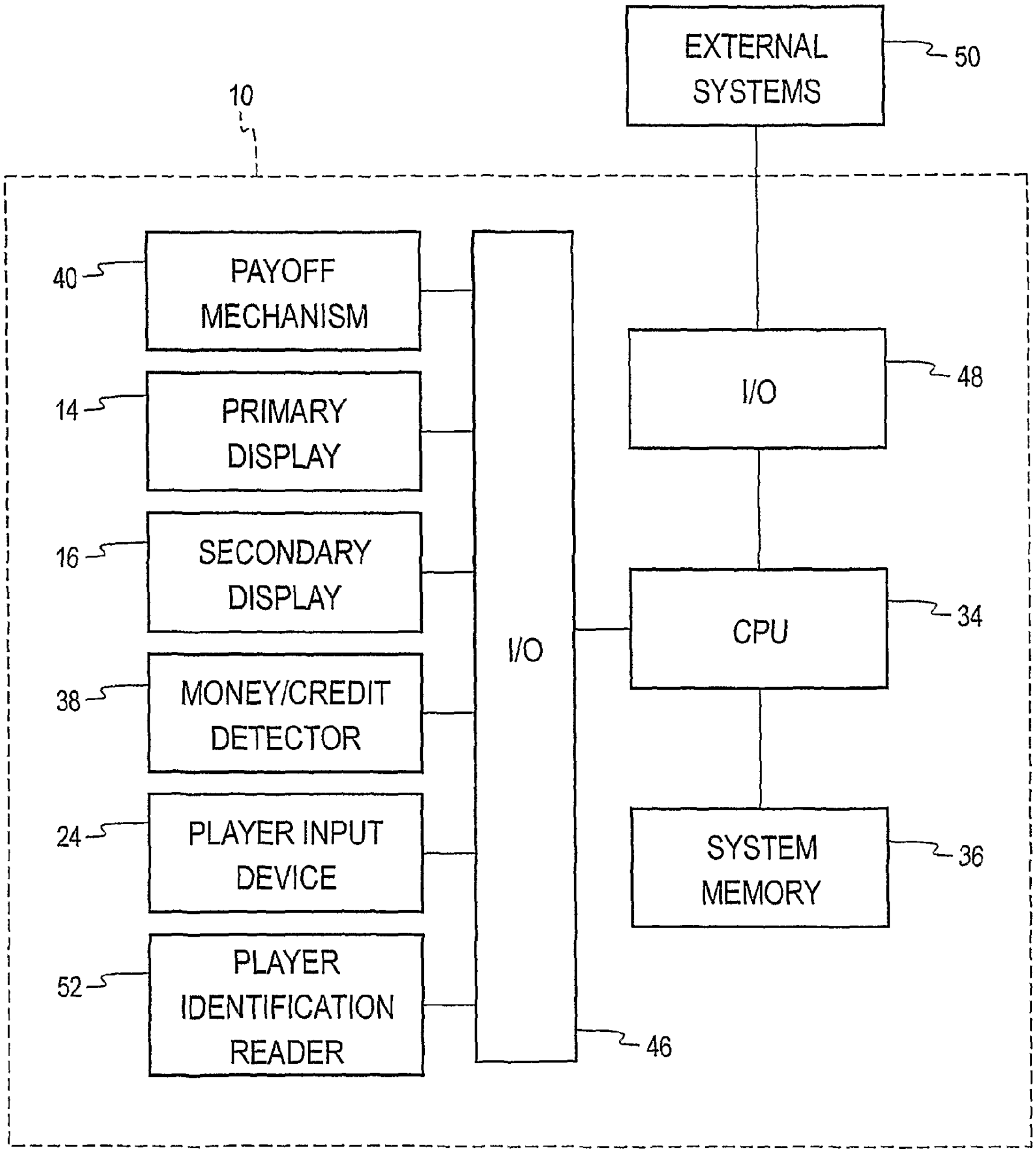
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
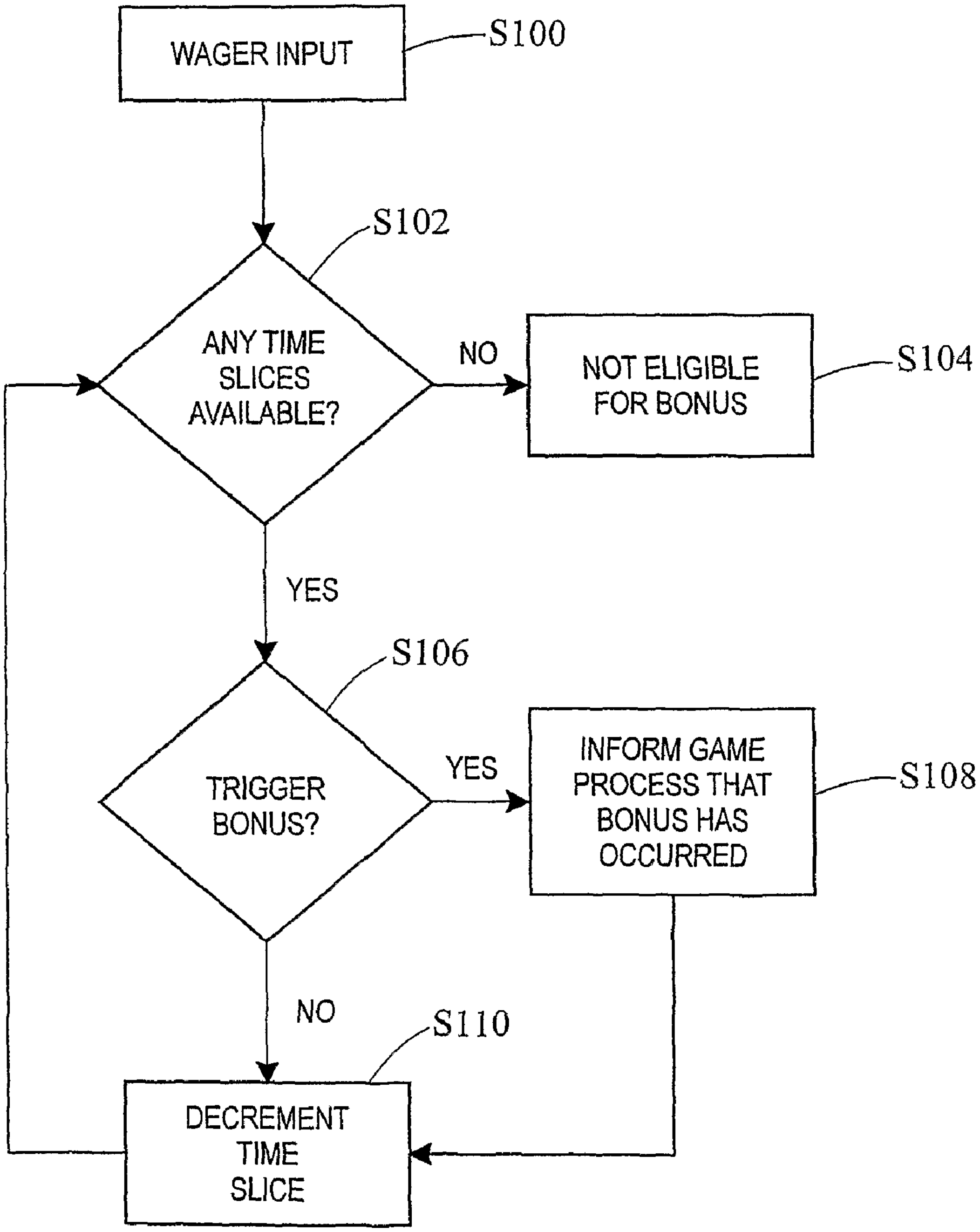
FIG. 3 is a flow chart representing a process of determining bonus-time eligibility for a standalone gaming machine, according to one embodiment of the present invention.

Turning now to FIG. 3, a flow chart illustrates a method for playing a bonus game based on time eligibility of a player. Time eligibility is measured using a time slice, which is the amount of time that a wagered amount gives eligibility to the player for playing the time-based bonus game. A time-slice counter is used to increment and/or decrement time slices for increasing and/or decreasing the time that the player is eligible to play the time-based bonus game. During each increment of time, an RNG determines whether the bonus game is triggered. If the player has eligibility during that increment of time, then the player is allowed to play the bonus game.

At step S100, a wager input is received from the player. Then, at step S102, a determination is made whether any time slices are available, i.e., whether the player is eligible for playing the bonus game. If the player does not have any time slices available, then, at step S104, it is determined that the player is not eligible for playing the bonus game. If the player has at least one time slice available, then, at step S106, a determination is made whether the bonus game should be triggered.

If the bonus game is triggered, then, at step S108, the game process is informed that the bonus game has occurred. At step S110, a time slice is decremented from the time-slice counter regardless of whether the bonus has been triggered. Then, the process goes back to step S102 to determine whether there are any time slices available.

A bonus multiplier, which is a function of the amount wagered with respect to time, is applied to base amounts awarded in the bonus game. For example, a slot base game includes 20 paylines. The player makes a wager of 20 credits, wherein a spin of the slot reels covers all 20 paylines at 1 credit bet per payline. For the player to receive a 1× bonus multiplier for 5 seconds, each time slice must be 250 milliseconds ("ms.") long, as shown in Equation 1.

Time Slice=5 seconds/20 credits bet=250 ms. EQUATION 1

In the above example, each credit buys 1 time slice of eligibility for the bonus game. Further, at every time slice interval (i.e., every 250 ms.) two things occur: i) a decision is made to determine if a time-based bonus game should be triggered, and ii) the number of time slices that the player has accumulated is updated, e.g., decremented.

The time-based bonus game is triggered, or awarded, at random and/or when a predetermined condition is met. In general, time-based bonus games are triggered asynchronously from normal game flow. An asynchronous process executes the RNG to select a random number at some predefined time interval. This random number is then compared to a predefined number or series of predefined numbers. If the random number matches, or is a subset of the predefined series, a bonus game should be triggered. If the random number does not match, or is not a subset of the predefined series, then no bonus game is triggered. The time interval of how often a number is selected, what range the number is selected from, and the criteria for matching to trigger a bonus are all dependent on the desired mathematics of the game.

For example, if the time-based bonus game is to take up to 10% of the total return in the wagering game, then each time slice should have an Expected Value ("EV") of 0.1 credits, as shown in Equation 2. It is assumed that the time slices are purchased for 1 credit.

10% of 1 credit=0.1 credits EQUATION 2

In addition, the EV of each time slice is as follows:

ET of a time slice=(Chance of the bonus)×(EV of the bonus) EQUATION 3

For example, if a bonus game pays at an EV of 200 credits, then 0.1 credits=(Chance of the bonus)×(200 credits) EQUATION 4

Therefore,

Chance of the bonus=$\frac{1}{2,000}$ each tine slice EQUATION 5

This means that on average one bonus game would occur every 2,000 time slices. For 250 ms. time slices, on average the bonus game would occur every 500 seconds, or every 8.3 minutes. As explained in more detail below, the process that triggers the time-based bonus game can be located locally, in another gaming machine, or on a server.

When the player presses a play button, e.g., a spin button on the player input device 24, time slices are purchased. The player can purchase enough time slices to qualify him or her for an enhanced multiplier, as discussed below. At every time slice interval, a process executes to remove one of the time slices. Optionally, more than one time slice can be removed when considering multipliers greater than 1×, as described in more detail below. The removal of the time slices continues until all of the player's time slices are removed. When all the time slices have been removed, the player becomes ineligible for playing the bonus game. In the above example, a total bet of 20 credits is made. The bet buys twenty 250 ms. time slices, or 5 seconds of bonus eligibility. Every time slice of 250 ms. is removed until no more time slices remain.

In the above examples, only a 1× multiplier has been discussed. However, higher bonus multipliers can be awarded for at least two reasons. First, as the player wagers more per game (i.e., multiple credits per payline), then the bonus awards should also increase. Second, if only 1× multipliers are awarded, then only the length of time eligibility continues to grow as the player's total wager amount increases (e.g., higher bet per line or faster play). For example, it is assumed that a first player has 10 minutes of time eligibility when a bonus game occurs, and a second player has 1 minute of time eligibility when the bonus game occurs. If only 1× multipliers are awarded, then both players will receive the same increase in their base awards. Thus, to further award the first player for having more eligibility time, a higher bonus multiplier is awarded.

Each multiplier level has a certain maximum number of purchasable time slices. After a wager fills an amount of time that has been designated to a specific multiplier level, the next level begins to fill. For example, the 1× multiplier level may have time slices purchased up to 30 seconds into the future. Any bet that exceeds the maximum number of allowed time slices for the 1× multiplier level begins to fill a 2× multiplier level. After the 2× multiplier level is filled, a 3× multiplier level begins to fill, and so on.

Figure 4:
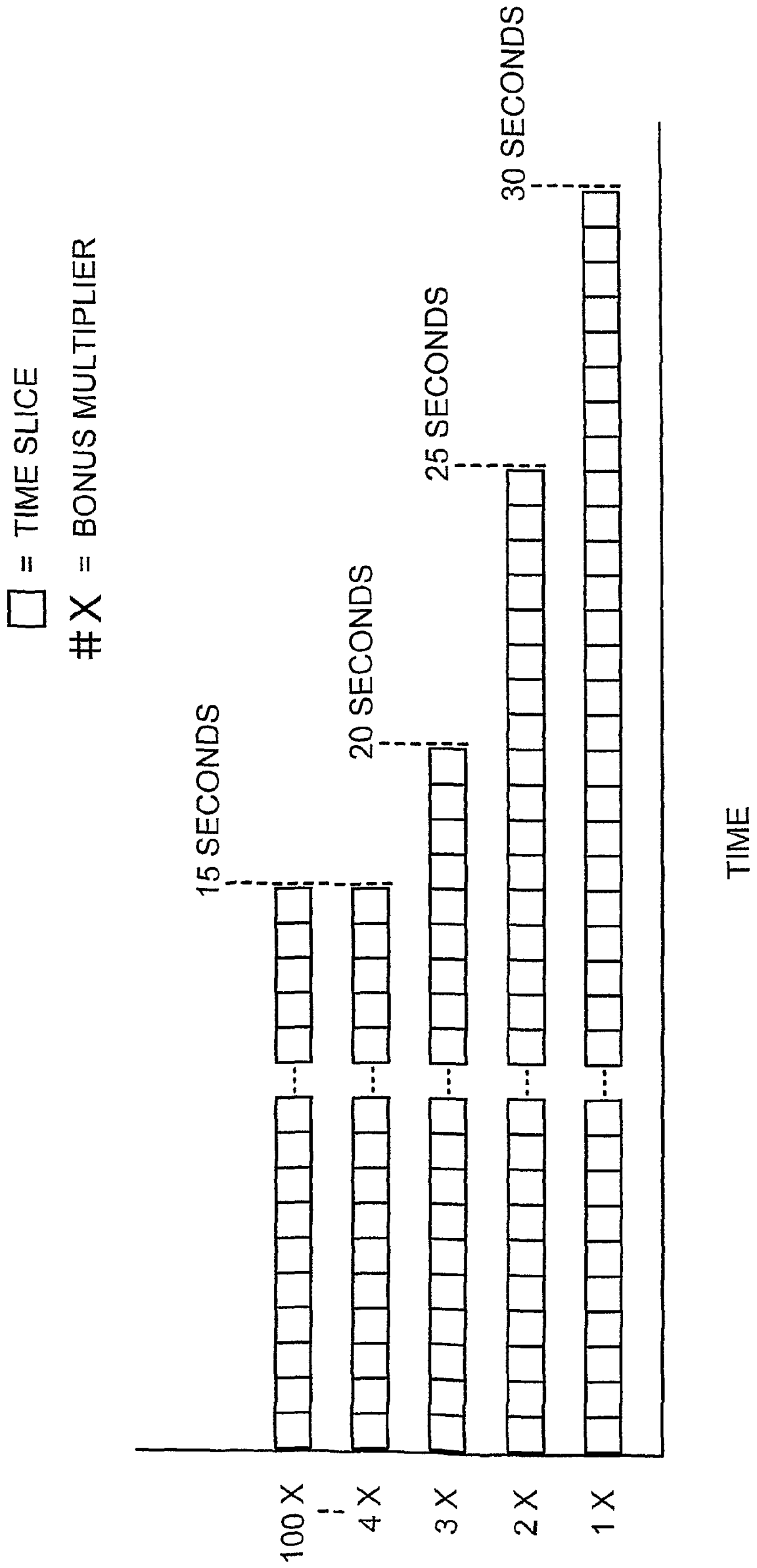
FIG. 4 is a diagrammatic indicating windows of bonus-time eligibility and corresponding bonus multipliers, according to an alternative embodiment of the present invention.

Referring to FIG. 4, an illustration shows how higher bonus multipliers are awarded to a player that is eligible for the time-based bonus game. At the 1× multiplier level, time slices can be purchased up to 30 seconds. If additional time slices are purchased, then the 2× multiplier begins to fill until the entire level is full, i.e., until all 25 seconds that are allocated to the 2× multiplier level have been filled with time slices. Then, the 3× multiplier level fills until all 20 seconds have been filled.

At some multiplier, and above, the time up to which time slices can be purchased will stop getting shorter. For example, for multipliers 4×-100× the allocated time of each level is 15 seconds.

When a time-based bonus game is triggered, the player's current maximum multipliers for which he/she is qualified multiplies all awards in the bonus game. In theory, the player could qualify for an infinite multiplier value. However, in practice a maximum cap can be applied to the multiplier values. For example, the maximum multiplier value can be 100×. The cap can be accomplished, for example, by a combination of limiting the speed of play and/or disabling wagering when the maximum value is reached.

Figure 5:
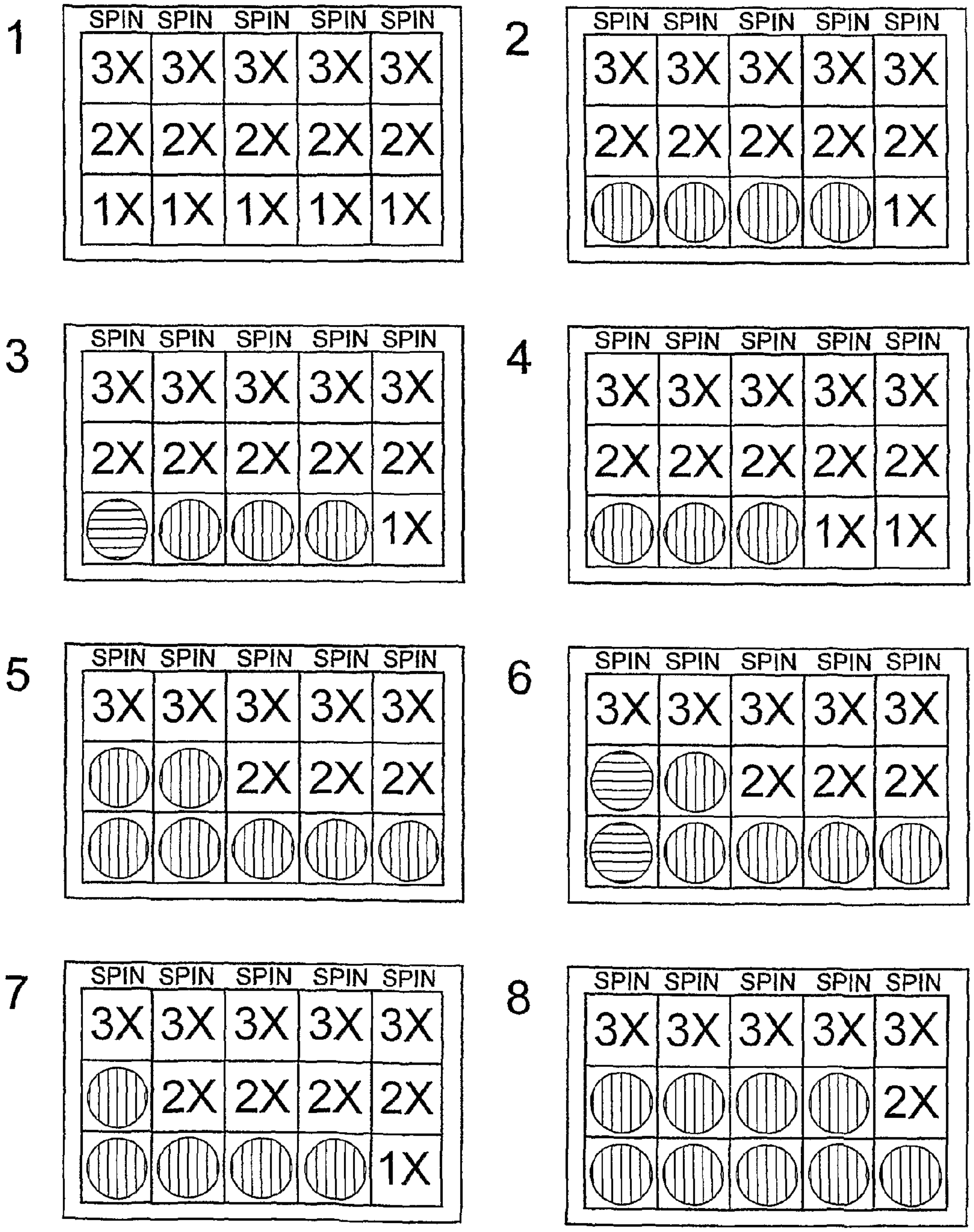
FIG. 5 is a diagrammatic indicating time removal from eligible bonus time, according to another alternative embodiment of the present invention.

Referring to FIG. 5, an illustration shows 8 snapshots regarding how time slices are incremented and decremented from a plurality of multiplier levels. It is assumed that each column represents a time slice of eligibility for spinning a plurality of reels during a bonus game. Further, each row represents one of three multiplier levels, 1×, 2×, and 3×, each multiplier level having a maximum of 5 time slices (or eligible spins).

In snapshot 1, the player has no time slices available, wherein the player has just started playing or is playing slowly. Thus, the player is not eligible for playing a time-based bonus game. In snapshot 2, the player has purchased 4 time slices, which are represented as vertically-hatched circles in the first four columns of the 1× multiplier level. When the player is not wagering, time slices are removed from the first column from each of the eligible multiplier levels. Thus, snapshot 3 shows a vanishing time slice, which is depicted as a horizontally-hatched circle, in the first column of the 1× multiplier level. As shown in snapshot 4, remaining eligibility time slices slide over after the time slice has been removed from the first column of the 1× multiplier level.

As the player continues to play, additional eligibility time slices will generally fill a full set of the 1× multiplier level and begin to fill the 2× multiplier level. In snapshot 5, the player has purchased five additional time slices. The first three time slices fill the 1× multiplier level, from left to right, and the last two time slices fill the first two positions of the 2× multiplier level. Thus, the player is now eligible for receiving a 2× multiplier for any awards won during the time-based bonus game.

In snapshot 6, the player is using the leftmost time slice of the 1× multiplier level and the leftmost time slice of the 2× multiplier level, both of which are shown as horizontally-hatched circles. Time slices are used, for example, during a base game of the wagering game.

According to one embodiment of the present invention, time slices are not used during the time-based bonus game. For example, when the time-based bonus occurs the time slices are not incremented/decremented, e.g., an eligibility clock stops ticking. Then, when the player resumes normal play, such as when returning to the base game, the time slices resume the process of incrementing/decrementing, e.g., the eligibility clock begins ticking again.

In snapshot 7 the leftmost circles shown in snapshot 6 have been removed and every other time slice has shifted by one column to the left. Thus, the player has now only one time slice available for the 2× multiplier, and three time slices available for the 1× multiplier. Then, in snapshot 8, the player has purchased four additional time slices. The first additional time slice fills the rightmost column of the 1× multiplier level, and the second-fourth additional time slices fill the second column-fourth column of the 2× multiplier level.

In snapshots 1-8 the time slices have been described to fill-in a first row (e.g., the bottom row), horizontally, before filling-in another row (e.g., a higher row). Alternatively, the time slices can fill-in a first column (e.g., a leftmost column), vertically, before filling-in another column (e.g., a central column). For example, referring to snapshot 2, instead of the four time slices filling-in the first four columns of the bottom row, the four time slices would fill-in the first column for each multiplier row (i.e., 3×, 2×, and 1×) and the second column for the top multiplier row (i.e., 3×).

In the horizontal fill-in method, a player wagering one credit per line could, for example, acquire 10 seconds of eligibility at the 1× multiplier. Under the vertical fill-in method, a player wagering five credits per line would still acquire only 10 seconds of eligibility, but the eligibility would be at a higher multiplier, e.g., at a 5× multiplier. Thus, instead of increasing the time of eligibility, the player would increase the bonus multiplier. One advantage of the vertical fill-in method is that the player tends to receive a bonus multiplier based on the wager per line (e.g., a 3× multiplier will be received for a three credits per line wager).

Additionally, wrapping of additional time slices also applies to the vertical fill-in method. Additional time slices are wrapped vertically to increase the bonus multiplier, when time slices at the player's current wager have already been filled to the maximum allowed time. For example, a player, which is currently at a 5× multiplier, that makes a wager of five credits per line, will increase the current multiplier level to a 10× multiplier if all of the allowed 5× multiplier time slices have been filled. Optionally, wrapping of additional time slices is only applied to a portion of the wager. For example, it is assumed that the player can add three seconds at the 5× multiplier level. A next wager of 5× may buy ten seconds of time slices that would generally be added to the 5× multiplier level. Because only three seconds can be filled at the 5× multiplier level, the remaining seven seconds are wrapped at the next multiplier level, e.g., at a 10× multiplier level. Thus, additional time slices are added vertically to increase the bonus multiplier, not horizontally to increase the eligibility time.

Figure 6:
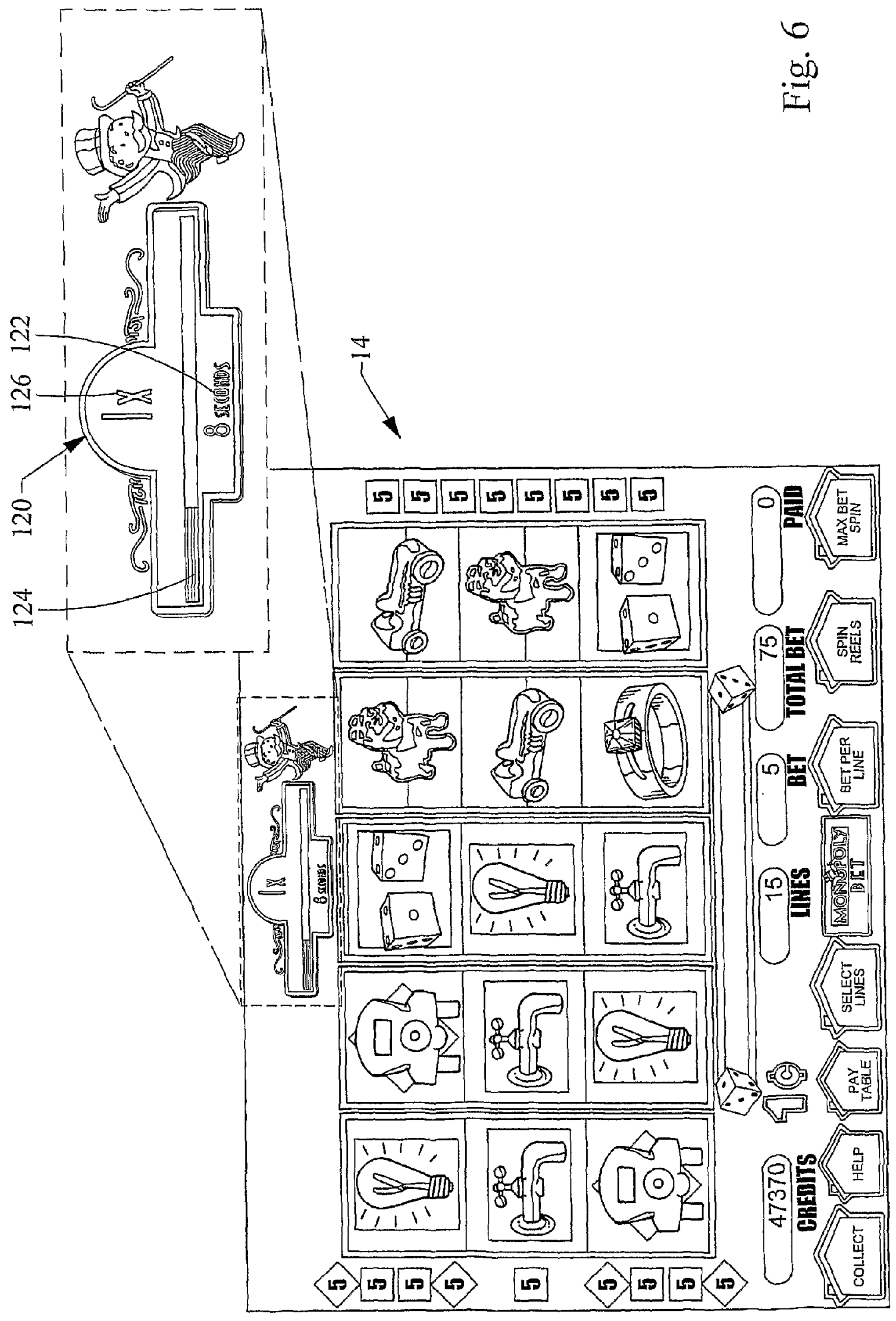
FIG. 6 is a representation of a game-screen indicating a counter of bonus-time eligibility having a single layer of time, according to another alternative embodiment of the present invention.

Referring to FIG. 6, the primary display 14 illustrates a time slice eligibility indicator 120 for communicating to the player the current level of time eligibility. The eligibility indicator 120 includes a time indicator 122, an eligibility bar 124, and a multiplier indicator 126. Like other aspects of the primary display 14, the CPU 34 controls the eligibility indicator 120.

The eligibility indicator 120 is displayed above a plurality of reels, during a base game. The time indicator 122 shows the player, numerically, how much time of bonus eligibility he/she currently has, e.g., 8 seconds. The eligibility bar 124 represents the percentage of eligibility that has been filled for the current multiplier level. For example, the current bar is filled to approximately 25% of its capacity.

The number shown in the multiplier indicator 126 is the current multiplier. As shown, the current multiplier is 1×. Thus, the player is aware that he/she is eligible for playing 8 seconds of a time-based bonus game, wherein, if the bonus game is triggered, any awards won during the bonus game will have a 1× multiplier. Further, the player is aware that the 1× multiplier level is only filled to about 25% of its capacity, wherein the full capacity of the 1× multiplier level is reached at about 30 seconds. If no time is left and the bonus game is triggered, the player is not eligible to play the bonus game.

Figure 7:
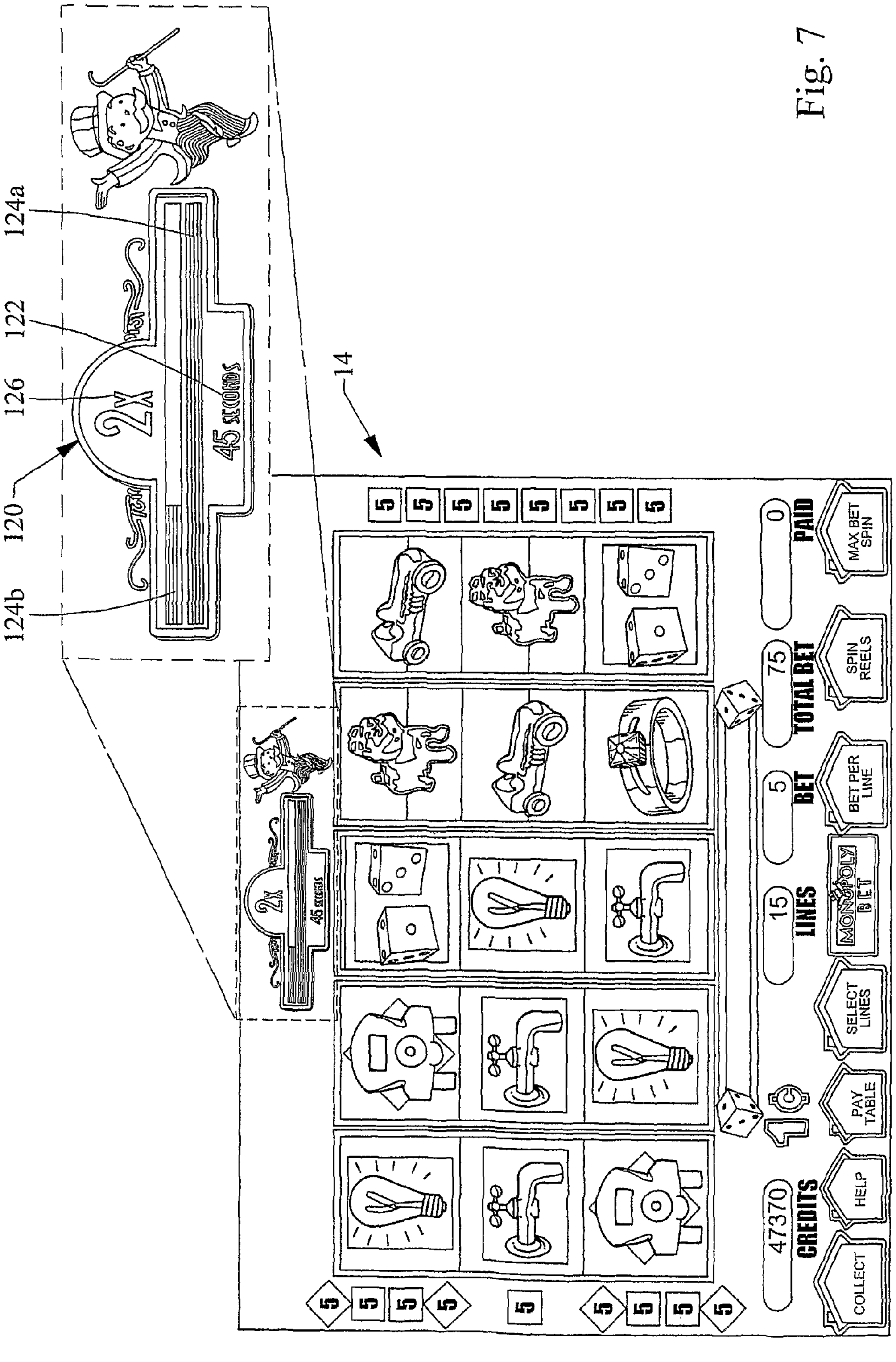
FIG. 7 is a representation of the counter of FIG. 6 having two layers of time, according to another alternative embodiment of the present invention.

Referring to FIG. 7, the eligibility indicator 120 now includes a first eligibility bar **124*a* and a second eligibility bar 124*b*. If the player's first eligibility bar 124*a* is full when the player makes a bet, then the second eligibility bar 124*b* appears as an additional bar, on top of the first eligibility bar 124*a*. As shown, the player has 10 seconds of eligibility at a 2× multiplier, which is shown in the multiplier indicator 126, and 35 seconds of eligibility at a 1× multiplier. Thus, the player has a total of 45 seconds of bonus-time eligibility. The addition of the second eligibility bar 124*b* is similar to the increase that takes place between snapshot 4 and snapshot 5 in FIG. 5**.

In this embodiment, eligibility at a higher multiplier is used before eligibility at a lower multiplier. Alternatively, eligibility can be used in any order. For example, eligibility time between the 2× multiplier and the 1× multiplier can be alternated every 2 seconds, wherein the player will receive a 2× multiplier the first two seconds, a 1× multiplier the next two seconds, a 2× multiplier the following seconds, and so on.

Other graphical methods can be used to display time eligibility. For example, a time hand of a stopwatch can be used to indicate the percentage of time eligibility, such as the percentage shown in the eligibility bars **124*a*-124*b***. Other methods can include showing the accumulation of items related to a theme of the game. For example, if the game is a MONOPOLY™ game, then the time eligibility can be represented by accumulation of coins, houses, and/or hotels.

Several other methods can be used to calculate the percentage of time eligibility. For example, only the percentage of eligible time slices for the currently active multiplier can be shown. Because the eligibility time of the player may include overlapping incremented and decremented time, wherein the player may purchase and use eligibility time generally simultaneously, the bar of eligible time does not increase and/or decrease in a smooth manner.

Another method shows the eligible time slices as compared to all possible time slices. In this method, the bar of eligible time increases and/or decreases in a smooth manner. However, if a high multiplier is possible, such as 100×, then in practice only small portions of the time eligibility percentage would actually fill in.

An alternative method shows the percentage of eligible time slices as compared to some set number of time slices. For example, a sum of all eligible time slices is compared to 100 time slices. The bar of eligible time increases and/or decreases in a smooth manner. If at any time the number of eligible time slices is above the set number of time slices, the percentage can still be displayed at 100%.

When the RNG hits a number that triggers the time-based bonus game, the player's current game is interrupted and the player plays the time-based bonus game (if the player is eligible). Then, when the time-based bonus game ends, the player resumes the current game. For example, the player's current game can be a local base game, such as slots, or a local bonus game. The player is allowed to play the time-based bonus game using the highest bonus multiplier for which the player is available. Alternatively, the player is allowed to play the time-based bonus using any other bonus multiplier.

The methods described above, in reference to FIGS. 3-7, can be implemented in a standalone configuration, such as the gaming machine 10. The time slices are incremented and/or decremented locally on the gaming machine 10. Similarly, the time-based bonus games are triggered locally on the gaming machine 10. In other methods, as described in more detail below, the time-based bonus game is a community bonus game having a plurality of gaming machines.

Figure 8:
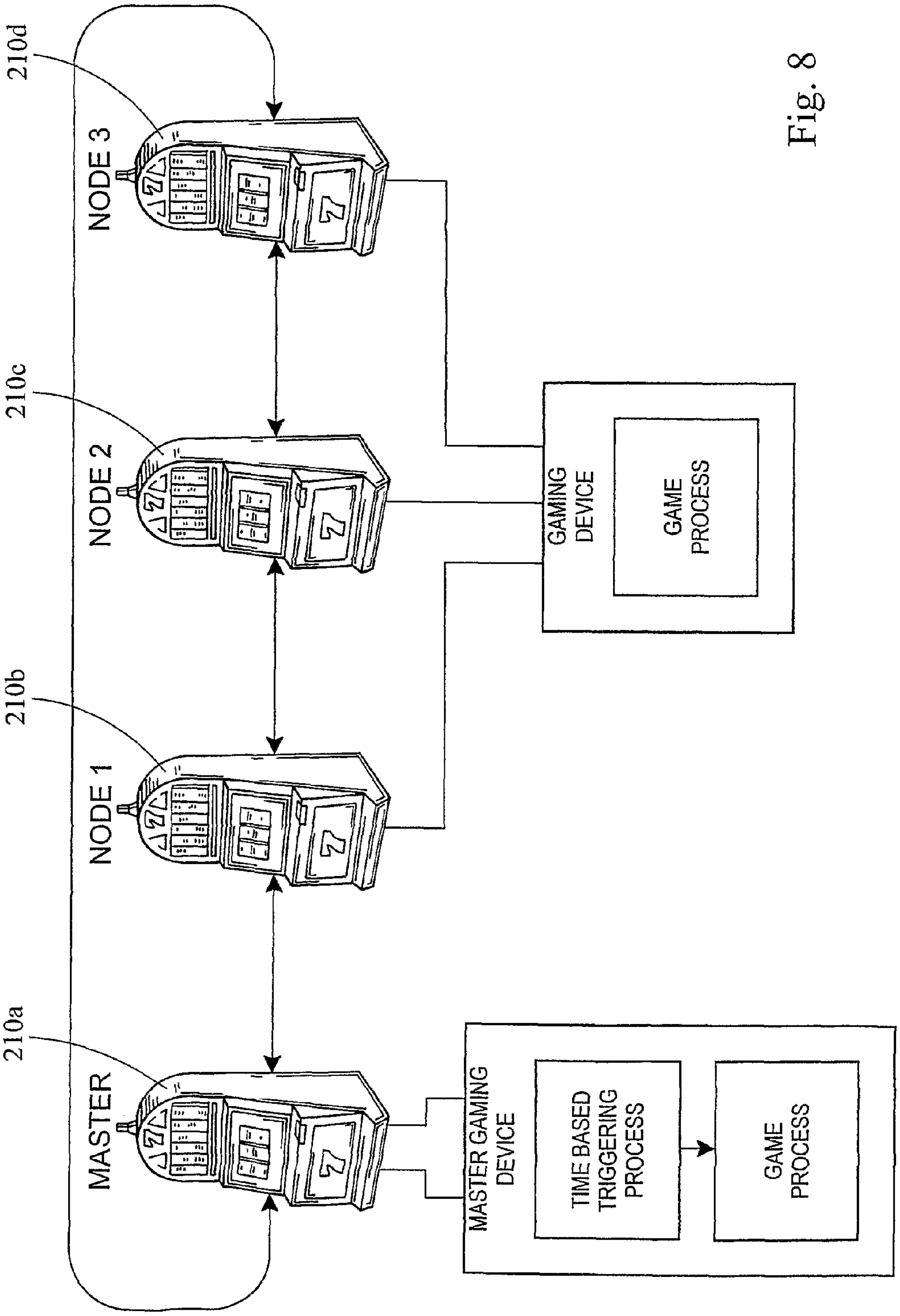
FIG. 8 is a representation of a plurality of networked gaming machines, according to another alternative embodiment of the present invention.

Referring to FIG. 8, a plurality of gaming machines 210*a*-210*d* are networked together for triggering a time-based bonus game, also referred to as a community bonus. The gaming machines 210*a*-210*d* include a master machine 210*a* and a plurality of node machines 210*b*-210*d*. The master machine 210*a* triggers the community bonus for all the gaming machines 210*a*-210*d*, wherein all the gaming machines 210*a*-210*d* participate in the community bonus at the same time if they are eligible. Optionally, in addition to sharing the timing of the bonus trigger, the machines can share game outcomes and player decisions.

Each one of the gaming machines 210*a*-210*d* participates in the community bonus according to the time-based eligibility that each machine determines locally. The master machine 210*a* continuously runs a process to determine if the community bonus should occur, using its RNG. For example, every 250 ms., the RNG in the master machine 210*a* determines if the community bonus is triggered. If the master machine 210*a* determines that the community bonus should occur, then it will issue an invitation to the node machines 210*b*-210*d*. Because each of the gaming machines 210*a*-210*d* keeps track of its own current eligibility, each of the gaming machines 210*a*-210*d* will make a decision whether it will allow the player to participate in the community bonus, and at which multiplier.

Alternatively, a bonus server is used instead of the master machine 210*a*. Thus, the master machine 210*a* would become a bonus server, which is connected to all the gaming machines 210*b*-210*d*. The triggering of the community bonus and the sharing of outcomes is determined by the server, instead of the master machine 210*a*.

Figure 9:
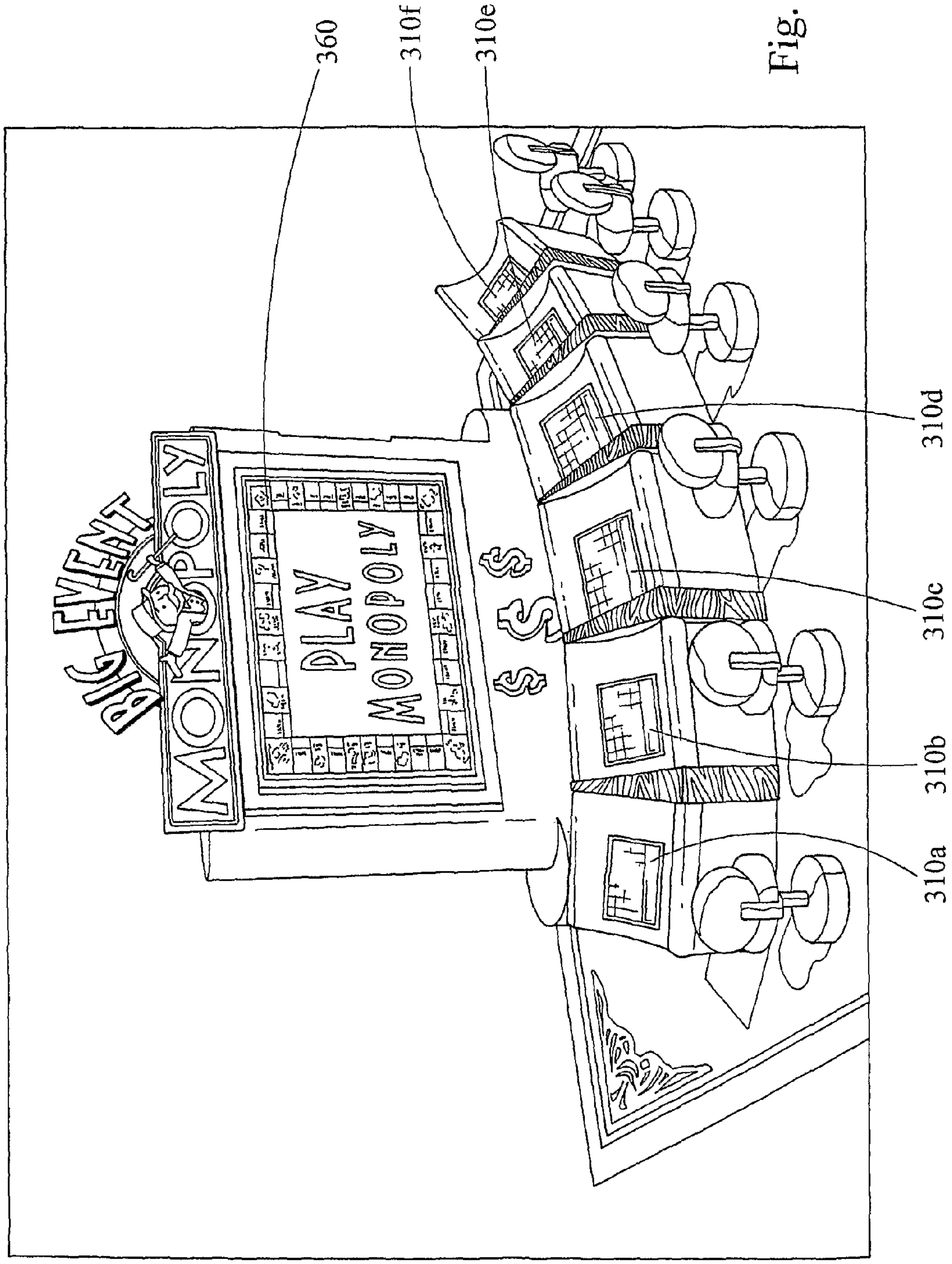
FIG. 9 is a perspective view representing a plurality of gaming machines coupled for playing a common bonus game, according to another alternative embodiment of the present invention.

Referring to FIG. 9, a plurality of gaming machines 310*a*-310*f* and a central screen 360 are networked together. The central screen 360 can include dual-sided plasma displays, a mechanical dice, and/or other devices designed to attract potential players to the gaming machines 310*a*-310*f*. Every played game buys the player a time slice of eligibility in a BIG EVENT BONUS, i.e., a community bonus. When the BIG EVENT BONUS is triggered, all eligible players get to play in the community bonus.

Figure 10:
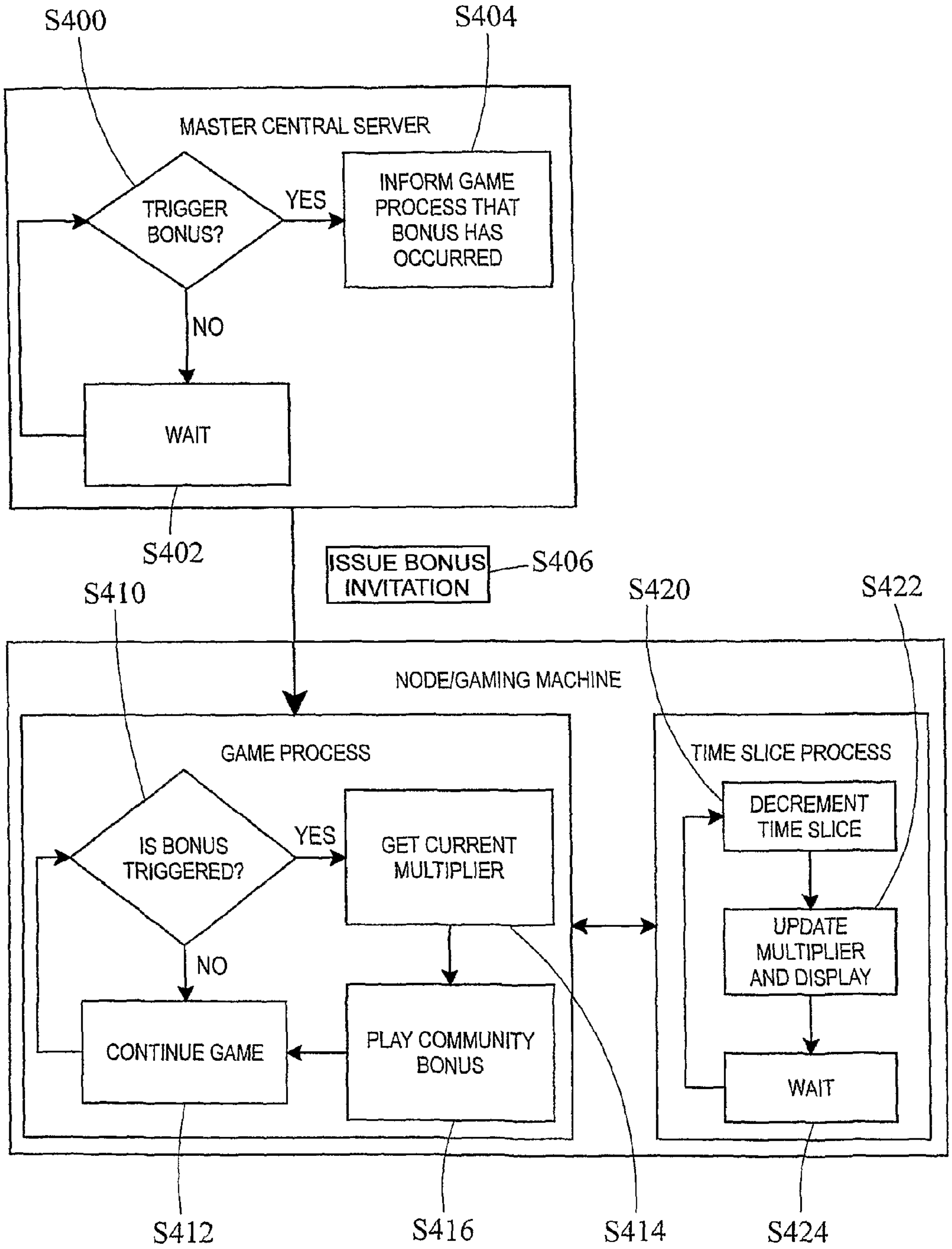
FIG. 10 is flow chart representing a process of determining bonus-time eligibility for a plurality of networked gaming machines, according to another alternative embodiment of the present invention.

Referring to FIG. 10, a flow chart illustrates an interaction between a master/central server and at least one node/gaming machine 10, 210, or 310 during a time-based bonus process. At step S400, the master determines whether a community bonus should be triggered. If a community bonus is not triggered, then at step S402 no action is taken. If a community bonus is triggered, then at step S404 the master informs the game process that the community bonus has occurred. At step S406 the master issues a bonus invitation to all the networked gaming machines 10, 210, or 310.

At step S410, during a game process, the gaming machine 10, 210, or 310 makes a determination whether the community bonus has been triggered, e.g., the gaming machine 10, 210, or 310 determines whether a bonus invitation has been issued at step S406. If a bonus game has not been triggered, then at step S410 the gaming machine 10, 210, or 310 continues playing a local game. If the community bonus has been triggered, then at step S414 the gaming machine 10, 210, or 310 obtains the current multiplier. If the gaming machine 10, 210, or 310 does not have any eligible time, then the multiplier is zero and the gaming machine 10, 210, or 310 cannot participate in the community bonus. Then, at step S416, the gaming machine 10, 210, or 310 plays the community bonus until the community bonus ends. After the community bonus ends, the local game resumes at step S410.

The bonus invitation can be received by the gaming machine 10, 210, or 310 at any time. For example, the bonus invitation for playing the community bonus can be received while a local bonus is already in progress. In this case, the gaming machine 10, 210, or 310 will play the community bonus to completion, and then the gaming machine 10, 210, or 310 will return to the local bonus at the point at which it was interrupted.

A time-slice process for the gaming machine 10, 210, or 310 continues generally simultaneously with the game process. At step S420 a time slice of eligibility is decremented after an equivalent unit of real time progresses, e.g., a time slice of 250 ms. is decremented after 250 ms. of time has passed in real time. If the player continues to make wagers, then it is possible for the time slices to increment (e.g., if the player makes wagers at a higher rate than he/she is currently playing games), or to remain constant (e.g., if the player makes wagers at an equal rate to the rate that he/she is currently playing games). Then, at step S422 a multiplier and/or display indicator are updated in function of the current eligibility. At step S424 the gaming machine 10, 210, or 310 waits until it is necessary to update the eligibility time, e.g., decrement a time slice.

Because the community bonus can occur during other bonus events, the gaming machine 10, 210, or 310 continues to decrement time slices during any local bonus. To counteract any negative perception of losing bonus eligibility while playing a local bonus, part of the estimated value from the local bonus can be applied towards awarding additional time slices to the player. If the local bonus is played at a reasonable pace, the additional time slices will maintain the player's eligibility throughout the duration of the local bonus game. Optionally, the local bonus can be made a time-based bonus. Alternatively, all community bonuses can be suspended when any game on the networked gaming machines 10, 210, or 310 triggers a local bonus.

Figure 11:
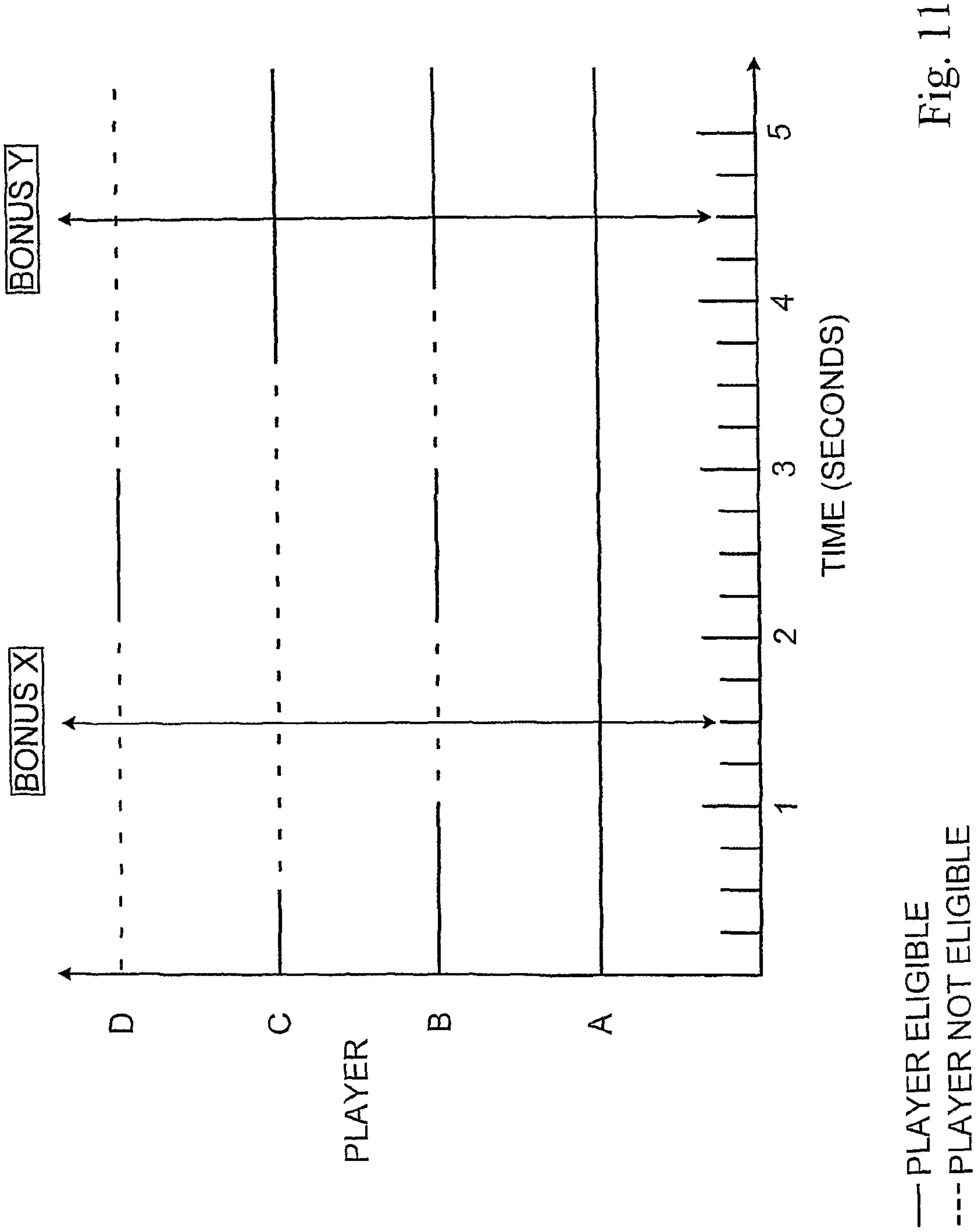
FIG. 11 is a diagrammatic indicating bonus eligibility for a plurality of players, according to another alternative embodiment of the present invention.

Referring to FIG. 11, a diagrammatic illustrates eligibility of a plurality of players during a 5 second time interval. The plurality of players includes players A-D. A plurality of time-based bonus games includes Bonus X and Bonus Y. A solid line indicates that the player is eligible for playing the bonus games, and a dashed line indicates that the player is ineligible for playing the bonus games.

Player A is eligible for playing a bonus game for all 5 seconds of the time interval. Player B is eligible for playing a bonus game during three distinct time periods of the time interval. Specifically, player B is eligible for playing a bonus game during the following time periods: 0.0-1.0 seconds, 2.0-3.0 seconds, and 4.0-5.0 seconds. Player C is eligible for playing a bonus game during two distinct time periods of the time interval. Specifically, player C is eligible for playing a bonus game during the following time periods: 0.0-0.5 seconds and 3.5-5.0 seconds. Player D is eligible for playing a bonus game only during the time period between 2.0-3.0 seconds.

Bonus X is triggered at 1.5 seconds of the time interval by a local RNG or a master RNG. Accordingly, only player A is eligible for playing bonus X at this time. Bonus Y occurs at 4.5 seconds of the time interval. Accordingly, only players A-C are eligible for playing bonus Y at this time.

During a community bonus, a base award is the same for all eligible players. However, the base award will be increased according to each player's current multiplier. Thus, even if the two eligible players win the same base award, their individual award might be different. For example, player A has a current multiplier of 3× and player B has current multiplier of 1×. If both players receive a base award of 50 credits while playing bonus X, then player A will receive a total award of 150 credits and player B will receive a total ward of 50 credits.

Time slices can be purchased according to fixed determinations, e.g., a single wager purchases a 250 ms. time slice. Alternatively, time slices can be purchased according to random determinations. For example, a first wager purchases a 250 ms. time slice while a second wager purchases a 300 ms. time slice.

Time slices can be incremented and/or decremented according to fixed determinations, e.g., a 250 ms. time slice is incremented and/or decremented every 250 ms. of real time. Alternatively, time slices can be randomly incremented and/or decremented. For example, random interrupt signals can be sent by the controller 34 for randomly incrementing and/or decrementing the time slices. Thus, in the above example, a first interrupt signal can be sent after a time interval of 200 ms., a second interrupt signal can be sent after a time interval of 300 ms., a third interrupt signal can be sent after a time interval of 800 ms., etc.

In an alternative embodiment, the gaming machine 10 may include both a time-based bonus game and a traditional bonus game, e.g., a symbol-triggered bonus game. If the player is awarded a symbol-triggered bonus game, the eligibility time continues to decrement during the symbol-triggered bonus game. Thus, the triggering of the symbol-triggered bonus game may be received by the player with a negative reaction. To counter, or prevent, the possible negative perception associated the symbol-triggered bonus game, a portion of the EV return of the symbol-triggered bonus game can be applied to the time-slice counter. Optionally, the EV can be taken from the overall wagering game, from a time slice, and/or from the symbol-triggered bonus game.

In one aspect of this alternative embodiment, the applied EV can be used to increase the eligibility time in the time-slice counter. For example, a percentage of the EV is used to increase the eligibility time of the time-slice counter according to a predetermined relationship, wherein the EV percentage is analogous to the wagered amount.

In another aspect of this alternative embodiment, the time-slice counter is temporarily stopped. The time period during which the time-slice counter is stopped depends, for example, on the portion of EV that is being taken and/or on the bonus multiplier. For example, it is assumed that the time-slice counter is stopped for 30 seconds if a player enters a symbol-triggered bonus game having a wager of five credits per line and a 5× bonus multiplier. If a different player enters a symbol-triggered bonus game having a wager of five credits per line and a 10× bonus multiplier (instead of a 5× bonus multiplier), the time-slice counter is stopped for only 15 seconds (instead of 30 seconds), taking in account the higher bonus multiplier. Thus, special time-slices (e.g., time slices that are accumulated during the symbol-triggered bonus game) are created in a separate group of time slices, wherein special time-slices are removed before regular time-slices (e.g., time slices that are not accumulated during the symbol-triggered bonus game). The removal of the special time-slices temporarily stops the removal of the regular time-slices.

Each of these embodiments and obvious variations thereof is contemplated as falling within the spirit and scope of the claimed invention, which is set forth in the following claims.

What is claimed is:

1. A gaming system for playing a wagering game, comprising:
- a wager input device for receiving a wager input for playing a single base game of said wagering game;
- a display for displaying said base game of said wagering game in response to receiving said wager input; and
- a controller coupled to said display and programmed to
  - in response to receiving said wager input, increment eligibility time to a counter of bonus-time eligibility, playing time of said base game being unaffected by said bonus-time eligibility,
  - decrement said counter as real time progresses, and
  - if said counter is greater than zero when a bonus game of said wagering game is triggered, allow said player to play said bonus game.

2. The gaming system of claim 1, wherein said controller is further programmed to:
- provide a bonus multiplier associated with said eligibility time, and
- award said bonus multiplier if said player wins an award during said bonus game.

3. A gaming system for playing a wagering game, comprising:
- a wager input device for receiving a wager input for playing a single base game of said wagering game;
- a display for displaying said base game of said wagering game in response to receiving said wager input; and
- a controller coupled to said display and programmed to
  - in response to receiving said wager input, increment eligibility time to a counter of bonus-time eligibility, playing time of said base game being unaffected by said bonus-time eligibility,
  - decrement said counter as real time progresses,
  - if said counter is greater than zero when a bonus game of said wagering game is triggered, allow said player to play said bonus game, and
  - in response to filling an initial level of a plurality of levels of said counter, increment eligibility time into a subsequently higher level of said plurality of levels, said subsequently higher level being associated with an incrementally higher bonus multiplier than a bonus multiplier associated with said initial level.

4. A gaming system for playing a wagering game, comprising:

a wager input device for receiving a wager input for playing a single base game of said wagering game;

a display for displaying said base game of said wagering game in response to receiving said wager input; and a controller coupled to said display and programmed to in response to receiving said wager input, increment eligibility time to a counter of bonus-time eligibility, playing time of said base game being unaffected by said bonus-time eligibility, decrement said counter as real time progresses, if said counter is greater than zero when a bonus game of said wagering game is triggered, allow said player to play said bonus game, add time to a first level of said counter, said first level having a corresponding first bonus multiplier, if said first level is full, add time to a second level of said counter, said second level having a corresponding second bonus multiplier, said second bonus multiplier being larger than said first bonus multiplier.

5. The gaming system of claim 4, wherein said controller is further programmed to multiply a bonus award with said second bonus multiplier to increase said bonus award, said bonus award being awarded during said second level of said counter, said second level being used before said first level.

6. The gaming system of claim 1, wherein said display further includes an indicator for said counter of bonus-time eligibility.

7. The gaming system of claim 1, wherein said eligibility time includes time units that are incremented and decremented linearly proportionate to real time.

8. The gaming system of claim 1, wherein said display and said controller is included in a standalone gaming terminal.

9. The gaming system of claim 8, further comprising a plurality of networked gaming terminals having a master gaming terminal, each of said gaming terminals including a display and a controller, said master gaming terminal randomly determining if said bonus game is triggered.

10. The gaming system of claim 8, further comprising a plurality of networked gaming terminals having a bonus server, each of said gaming terminals including said display and said controller, said bonus server determining the occurrence of said bonus game.

11. A method of conducting a wagering game on a gaming machine, the method comprising:

using a wager input device for receiving at least one wager input from a player for playing a base game of said wagering game;

displaying on a display said base game;

in response to receiving said wager input, using one or more controllers for incrementing eligibility time to a counter of bonus-time eligibility, playing time of said base game being unaffected by said bonus-time eligibility;

using at least one of said controllers for determining, on a periodic basis, if a bonus game of said wagering game has been randomly triggered; and in response to said counter being greater than zero when said bonus game is triggered, allowing said player to play said bonus game.

12. The method of claim 11, further comprising:

providing a bonus multiplier associated with said eligibility time; and awarding said bonus multiplier if said player wins an award during said bonus game.

13. The method of claim 11, further comprising, in response to filling an initial level of a plurality of levels of said counter, incrementing eligibility time into a subsequently higher level of said plurality of levels, said subsequently higher level being associated with an incrementally higher bonus multiplier than a bonus multiplier associated with said initial level.

14. The method of claim 11, further comprising:

adding time to a first level of said counter, said first level having a corresponding first bonus multiplier;

if said first level is full, adding time to a second level of said counter, said second level having a corresponding second bonus multiplier, said second bonus multiplier being larger than said first bonus multiplier.

15. The method of claim 14, further comprising multiplying a bonus award with said second bonus multiplier to increase said bonus award, said bonus award being awarded during said second level of said counter, said second level being used before said first level.

16. The method of claim 11, further comprising indicating said counter of bonus-time eligibility on a display of said gaming machine.

17. The method of claim 11, further comprising incrementing and decrementing time units of said eligibility time linearly proportionate to real time.

18. A computer readable storage medium encoded with instructions for directing a gaming device to perform the method of claim 11.

19. A method of conducting a wagering game on a gaming system having a plurality of gaming terminals for playing a common special event associated with said wagering game, the method comprising:

receiving at least one first wager input via a first wager input device on a first one of said plurality of gaming terminals for playing a base game of said wagering game;

displaying on a display said base game;

in response to receiving said first wager input, using one or more controllers for incrementing eligibility time to a first counter of bonus-time eligibility associated with said first one of said plurality of gaming terminals, playing time of said base game being unaffected by said bonus-time eligibility;

receiving at least one second wager input via a second wager input device on a second one of said plurality of gaming terminals for playing another base game of said wagering game;

in response to receiving said second wager input, incrementing eligibility time to a second counter of bonus-time eligibility associated with said second one of said plurality of gaming terminals, playing time of said another base game being unaffected by said bonus-time eligibility;

if any of said first counter and second counter is greater than zero when said common bonus game is triggered, allowing a player of a corresponding one of said plurality of gaming terminals to play said common bonus game.

20. The method of claim 19, further comprising triggering said common bonus game using a gaming device selected from a group consisting of a master terminal and a bonus server.

21. The method of claim 19, further comprising:

providing a first bonus multiplier associated with said first counter and a second bonus multiplier associated with said second counter; and awarding one or more of said first bonus multiplier and said second bonus multiplier if said player of said corresponding one of said plurality of gaming terminals wins an award during said bonus game.

22. A method of initiating a special event for a wagering game, comprising:

using a wager input device for receiving a wager input from a player for playing said wagering game;

displaying on a display said base game;

in response to receiving said wager input, using one or more controllers for providing said player with one or more bonus-time eligibility increments from a plurality of time increments during which said player is eligible to participate in said special event, playing time of said wagering game being unaffected by said bonus-time eligibility increments;

for at least one of said plurality of time increments, triggering said special event; and if said at least one of said plurality of time increments is a time increment for which said player has been provided a bonus-time eligibility increment, allowing said player to play said special event.

23. The method of claim 22, wherein time increments of said plurality of time increments are consecutive time increments.

24. The method of claim 22, further comprising removing bonus-time eligibility increments for said one or more bonus-time eligibility increments as real time progresses.

* * * * *